CASCADED HARMONIC MULTIPLIERS

Filed June 25, 1962 3 Sheets-Sheet 1

INVENTOR.
KENNETH P. STEELE
BY [signature]
ATTORNEY

July 26, 1966 K. P. STEELE 3,263,154

CASCADED HARMONIC MULTIPLIERS

Filed June 25, 1962 3 Sheets-Sheet 2

INVENTOR.
KENNETH P. STEELE

BY Spencer E. Olson

ATTORNEY

INVENTOR.
KENNETH P. STEELE
BY Spencer E. Olson
ATTORNEY 3,263,154
Patented July 26, 1966

3,263,154

CASCADED HARMONIC MULTIPLIERS

Kenneth P. Steele, Eden, N.Y., assignor to Sylvania Electric Products Inc., a corporation of Delaware Filed June 25, 1962, Ser. No. 204,937
11 Claims. (Cl. 321—69)

This invention relates generally to signal generation and is more particularly concerned with solid state circuitry for generating relatively high power signals at microwave frequencies by harmonic multiplication.

A primary object of the invention is to provide apparatus for generating signals at microwave frequencies.

Another object of the invention is to provide apparatus for cascading harmonic multipliers, operable at microwave frequencies, to achieve high operating efficiencies.

Another object is to provide cascaded harmonic multipliers of reduced weight and volume, yet capable of stable, efficient operation.

Briefly stated, these objects, and others which will become apparent as the description proceeds, are achieved through the novel combination of a pair of varactor diodes as the harmonic generators with a coaxial line structure for removing undesired harmonics and for matching the varactors to their respective input and output circuits. The coaxial line structure is fabricated in a machined block formed of conductive material, resulting in a compact, rugged assembly, having the attendant advantage of stability of operation of the multiplier. A significant feature of the microwave structure is the combination of a stub with a resonant cavity to achieve matching, frequency trapping and filtering functions in a structurally simple and compact assembly.

Other objects, features and advantages of the invention, and a better understanding of its construction and operation, will be apparent from the following detailed description taken in conjunction with the accompanying drawings, in which.

Figure 1:
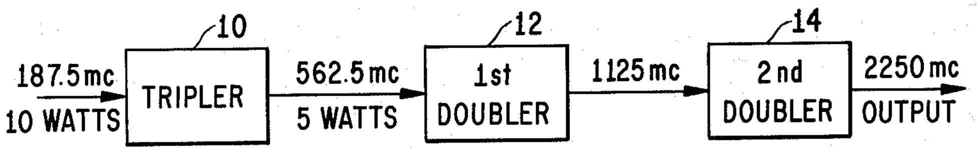
FIG. 1 is a block diagram of a cascaded harmonic generator, illustrating the nature of the problem solved by this invention.

Referring now to the drawings, FIG. 1 is a block diagram of a cascaded harmonic multiplier of the general type to which the invention pertains. For the frequencies indicated on the diagram, which it will be understood are by way of example only, the multiplication of frequency from 187.5 megacycles to a desired output frequency of 2,250 megacycles can be achieved by a tripler circuit 10 followed by a pair of doubler circuits 12 and 14. At the input frequency and power level indicated, the tripler may be fabricated with lumped constants in accordance with techniques well known to the art. As indicated, triplers are available which are capable of multiplying by three at these frequencies with a power loss of 50%. At frequencies higher than 562.5 megacycles, however, it is not convenient to employ lumped constants, and in general, the multiplication of frequencies above this level presents difficult design and fabrication problems. It is with the design and construction of cascaded doublers 12 and 14 that the present invention is concerned.

Figure 2:
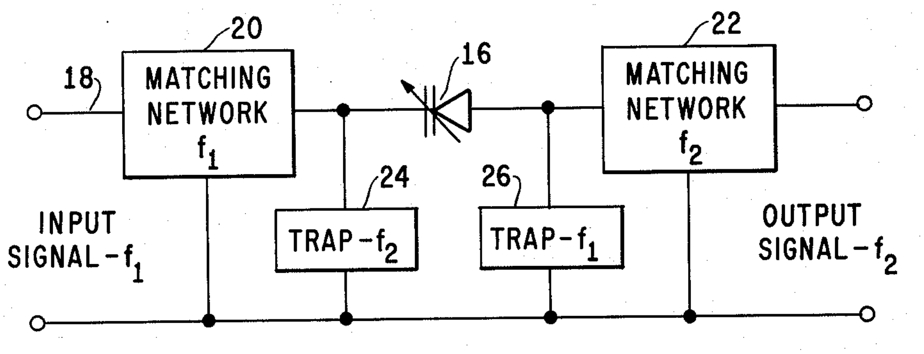
FIG. 2 is a block diagram of a series doubler circuit employing a varactor as the non-linear element.

Although a number of doubler circuits are known to the art, the present circuit employs a varactor diode as the non-linear element in a series multiplier configuration as shown in FIG. 2. The illustrated series configuration is preferred over a shunt arrangement for ease in constructing the necessary tuning adjustments in the coaxial line microwave structure in which the varactor is connected. As shown in FIG. 2, the varactor diode 16, which, in essence, is a semi-conductor P–N junction whose junction capacitance is a function of the bias voltage supplied to the diode, is connected in series with the signal input line 18, and in a coaxial line system is directly in series with the inner conductor of the line. The input signal source, such as the tripler 10 of FIG. 1, is matched to the varactor by a suitable impedance matching network 20, which is series resonant at the frequency $f_1$, and the output is derived from another impedance matching network 22, which is series resonant at the desired harmonic frequency $f_2$. These matching networks are used to maximize the efficiency of signal energy transfer from the signal source to the diode and from the diode to the output load. Shunt connected, series-resonant traps 24 and 26 are provided in the input and output circuits, respectively, to provide a short circuit for frequencies $f_2$ and $f_1$, respectively, thereby preventing unnecessary power dissipation and maximizing conversion efficiency. Although not shown in FIG. 2, a suitable source of bias for varactor 16 is necessary.

It will be appreciated that in a particular range of input frequencies, the nature and size of matching network 20 and trap 26 may differ appreciably from matching network 22 and trap 24. This is particularly true in the example shown in FIG. 1 where at the input frequency of 562.5 megacycles, distributed parameters are rather long and preclude a compact package, and at the output frequency of 1,125 megacycles lumped circuit elements are difficult to use. As a comprise, primarily to achieve a package of small size, lumped constant circuits may be used in matching network 20 and trap 26, and coaxial line distributed parameters used in matching network 22 and trap 24 in the first doubler 12 (FIG. 1). The input frequency to the second doubler 14 is sufficiently high that distributed parameter circuit elements can conveniently be used in both the input and output matching networks.

Figure 3:
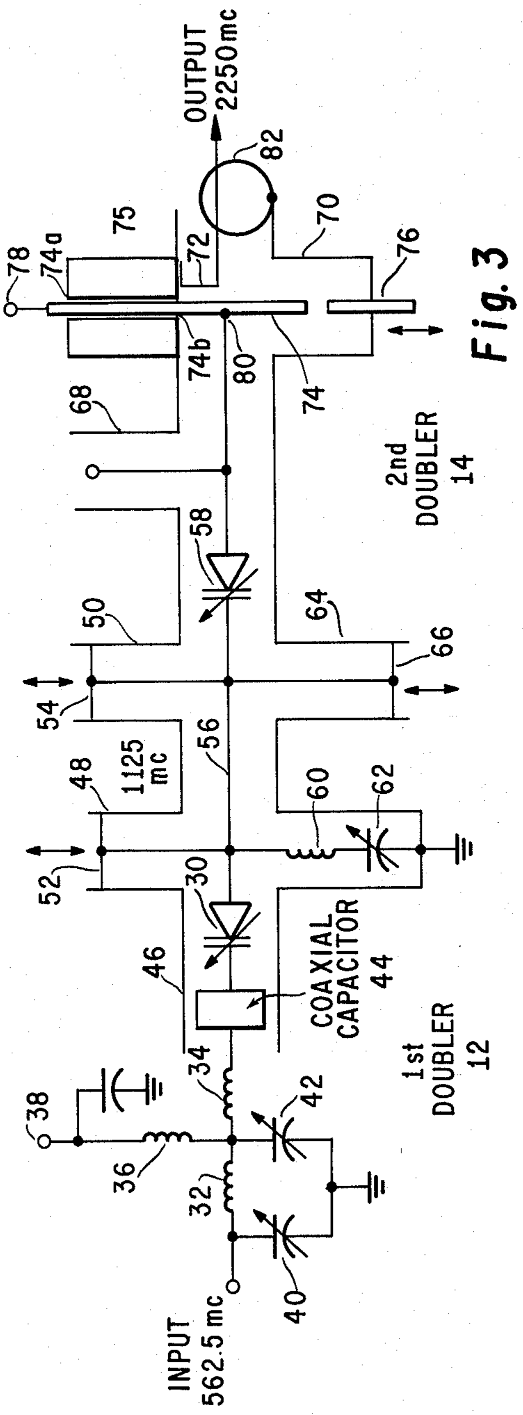
FIG. 3 is a microwave schematic diagram of one form of cascaded doubler circuit embodying the invention.

Referring to FIG. 3, which is a microwave schematic diagram of one embodiment of the cascaded doublers 12 and 14 of FIG. 1, the matching network between the tripler 10 and varactor 30 of the first doubler comprises a lumped constant double pi network including inductors 32 and 34, the latter being the inductance of a lead, a pair of variable capacitors 40 and 42, and a low-loss coaxial capacitor 44. The junction of inductors 32 and 34 and capacitor 42 is connected through a RF choke 36 to terminal 38, which represents a source of bias for varactor 30. The tripler is matched to the varactor by adjustment of capacitors 40 and 42. In addition to serving as one leg of the matching network, coaxial capacitor 44 functions as an input trap (trap 24 of FIG. 2) by providing a very low impedance path to the grounded outer conductor of the coaxial line 46 for the second harmonic of the input frequency, as well as for both odd and even higher order harmonics. It is here significant to note that the utilization of a coaxial capacitor as one leg of the lumped constant pi network offers a number of advantages over a distributed parameter network. As has been mentioned previously, a shorted quarter wavelength stub or similar matching device would require considerable space at the frequency in question, and more importantly, would trap only the even, or the odd, higher order harmonics. Thus, the coaxial capacitor, in conjunction with the lumped constant circuit, provides the advantages of effective trapping of all harmonics, it consumes a minimum of space, and in addition to comprising a portion of the matching network it provides a compatible transition from the lump constant structure to the coaxial line distributed parameter construction of the remainder of the circuit.

The output matching network for varactor 30 includes two tuning stubs 48 and 50, respectively short-circuited by movable shorting plugs 52 and 54, the inner conductors of which are connected to a conductor 56 connected between varactor 30 and varactor 58 in the second doubler. These tuning stubs serve the dual purpose of matching the output impedance of varactor 30 to the input of varactor 58 and providing a D.C. return for the bias applied to varactors 30 and 58. A series-resonant trap consisting of inductor 60 and variable capacitor 62 and designed to suppress the fundamental frequency (in this case, 562.5 megacycles), is connected between inner conductor 56 and the grounded outer conductor of the coaxial line structure.

A third quarter-wave stub 64, the movable short 66 of which is connected to conductor 56 at the input side of varactor 58, appears as an open circuit to the input frequency (1,125 megacycles) to varactor 58, and a short circuit to the second harmonic of this frequency; i.e., 2,250 megacycles. Accordingly, this stub corresponds to trap 24 in the schematic circuit of FIG. 2. At the output side of varactor diode 58 an open-circuited quarter-wave stub 68, the inner conductor of which is connected to the inner conductor of the main transmission line, and a resonant coaxial cavity 70 are combined to provide impedance matching, trapping and filtering. The output cavity 70 includes a fixed coaxial stub 74 to a tap 80 on which the inner conductor of the main transmission line is connected, and a second stub 76 disposed colinearly with stub 74 and arranged for axial movement to tune the cavity. The cavity is designed to be resonant at 2,250 megacycles so as to suppress the fundamental input frequency (1,125 megacycles). Varactor diode 58 is matched to the output load impedance by this combination of elements; reactive matching is provided by the open stub 68, and resistance matching is achieved by selection of the position of tap 80 on stub 74. The portion of stub 74 extending into the cavity is approximately a quarter wavelength long at 2,250 megacycles, the stub being supported in non-contacting relationship in a conductive structure 75 outside the cavity. The stub is electrically shorted to the end wall of the cavity 70, at **74*b*, by reflection of the open circuit at 74*a* between the stub and the adjacent conductive member 75, which is located a quarter wavelength away. The use of this non-contacting short at 74*b* allows a D.C. bias signal for varactor 58 to be applied at terminal 78 and conducted through stub 74, and through a tap 80 thereon, to the varactor 58. An output signal (2,250 megacycles) is coupled from the cavity by a suitable loop 72 connected to the inner conductor of a coaxial connector 82**.

Figure 4:
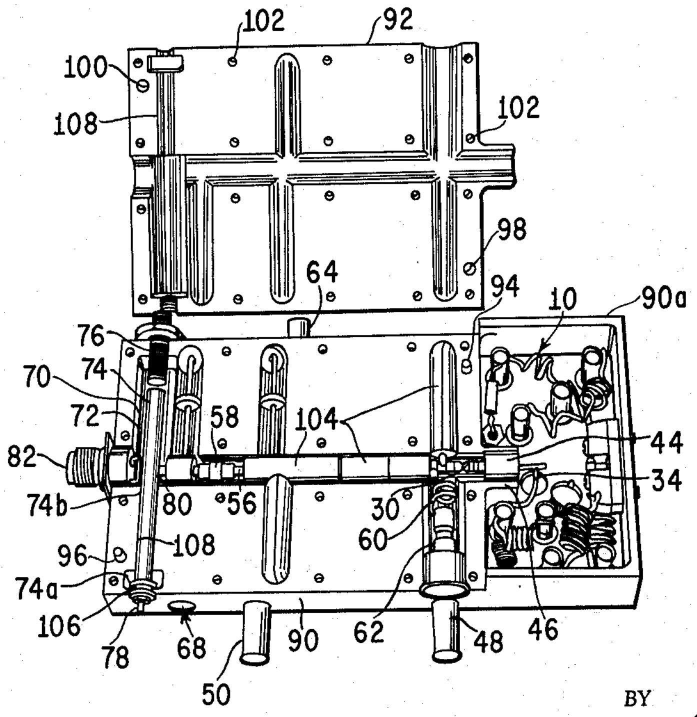
FIG. 4 is a pictorial "open book" view of a practical embodiment of the circuit schematically depicted in FIG. 3.

Good operating efficiency and stability of the circuit described in FIG. 3 is achieved by packaging it in a rigid assembly, a practical embodiment of which is pictorially represented in FIG. 4. The coaxial line portion of the circuit of FIG. 3 is formed in a machined block formed of conductive material, such as aluminum, in which the inner conductors are suitably supported. As shown, the block is formed in two halves 90 and 92, each having complementary bores of semi-circular cross section milled therein such that when the cover 92 is folded over on top of section 90, bores of circular cross-section are formed in the block. Accurate alignment of the bores in the two sections is achieved by a pair of locating pins 94 and 96 in block 90 which engage openings 98 and 100, respectively, in the plate 92. The plates are firmly held together by screws or bolts (not shown) placed through aligned openings 102 in both plates. The cylindrical bores serve as the outer conductors of the several coaxial lines and other coaxial components of the circuit.

As illustrated, the coaxial capacitor 44 is located in the coaxial bore 46 at one end of the microwave structure, and the varactors 30 and 58 are connected in the inner conductor 56 which extends from the coaxial capacitor to the tap 80 on stub 74. Conductor 56 is supported coaxially of the bore by sleeves 104 of suitable dielectric material, such as Teflon.

The output cavity 70 in the present embodiment is of rectangular cross-section and formed by accurately milling depressions in the two sections of the block. The cavity may also be formed by a cylindrical bore, if desired. One end of the coaxial stub 74 is supported on a pair of spaced dielectric washers 106, the portion of the stub enclosed by the bore 108 being insulated from the block by a suitable dielectric tape, such as Teflon. The dielectric material besides keeping the stub out of contact with the bore serves to shorten the physical length of this approximately quarter wavelength line. Energy is coupled from the cavity by an inductive loop 72 positioned near the stub and connected to coaxial connector 82.

The several tuning stubs branch off at right angles to the conductor 56 and are formed of coaxial lines, the inner conductors of which are supported on insulating beads or sleeves. It is to be noted that the lumped constant inductor 60 and capacitor 62 (which form trap 26 in the general schematic of FIG. 2) are physically positioned in one of the branches in the microwave portion of the assembly of FIG. 4.

As was mentioned in the discussion of FIG. 3, the matching network for the input signal is formed of lumped constant components. At the frequencies under consideration these components are relatively small, and as shown in FIG. 4 are packaged in a rectangular housing **90*a*, which is an integral extension of the lower plate 90. Thus, the lumped constant components are contained in the same rigid package with the coaxial line structure without appreciable increase in size of the overall package. When a cover (not shown) is placed over the housing 90*a*, this portion of the circuit, and the microwave circuit, are well shielded thereby preventing spurious radiation from the equipment and eliminating microwave ground loop problems. Another advantage of the illustrated construction is its ability to transfer heat from the varactors; the shorting stubs make metal-to-metal contact with the inner conductor 56 and to the conductive block, thereby providing direct thermal paths from the heat dissipating components to the large area metal block. The coaxial capacitor 44 also provides an additional thermal path for varactor 30**.

Since the tripler circuit 10 (FIG. 1) is not a part of the present invention it has not been described in detail, but it is to be noted that the components of this circuit are also packaged in the housing **90*a***. A circuit package constructed in accordance with FIG. 4 which has been satisfactorily operated occupied a volume of 3 x 6 x 1 inches. With an input of five watts from the tripler at 562.5 megacycles, the conversion loss of the first doubler was approximately 4.5 db, giving an output of approximately 1.8 watts at 1,125 megacycles. The second doubler, with a 4.0 db conversion loss, provided an output of 600 milliwatts, nominal, at 2,250 megacycles. This performance was obtained using a PC 115–10 varactor in the first doubler and an MA 4285 varactor in the second doubler.

Figure 5:
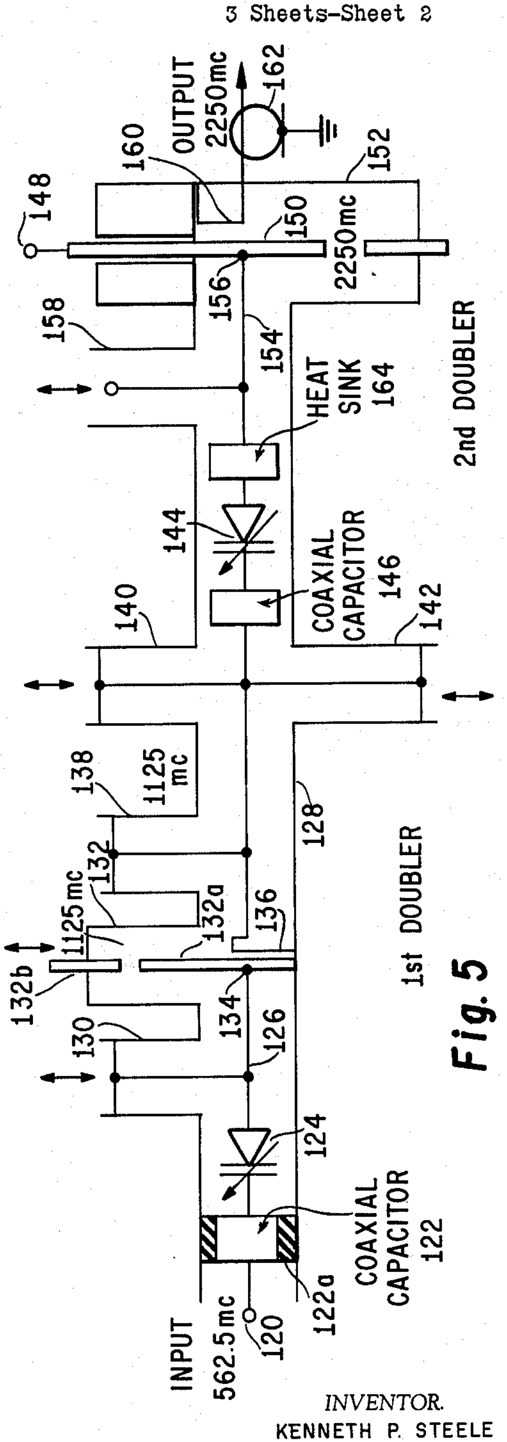
FIG. 5 is a microwave schematic diagram of another form of cascaded doubler circuit embodying the invention.
Figure 6:
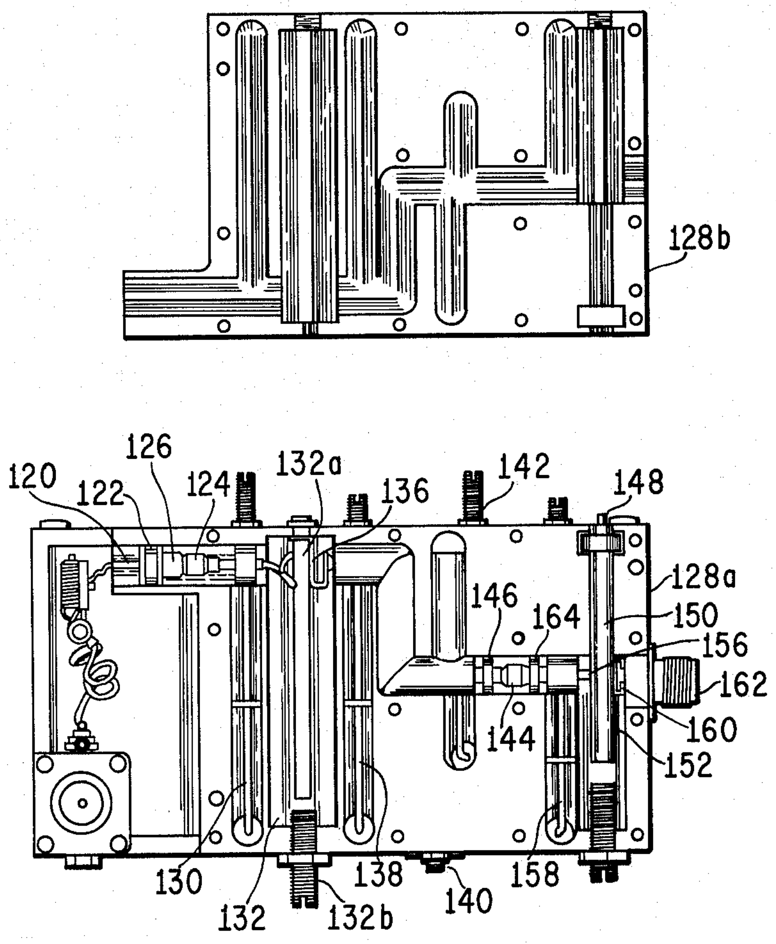
FIG. 6 is a pictorial "open book" view of a practical embodiment of the circuit shown schematically in FIG. 5.

FIGS. 5 and 6 respectively schematically and pictorially illustrate another arrangement of cascaded doublers, again for multiplying from 562.5 megacycles to 2,250 megacycles. The input signal at 562.5 megacycles, derived from a suitable tripler or other preceding stage, is applied via terminal 120 through a coaxial capacitor 122 to a first varactor 124, it being understood that a suitable matching network corresponding to network 20 in FIG. 2, is included in the preceding stage. As in the circuits of FIGS. 3 and 4, the coaxial capacitor and varactor are connected in series with the inner conductor 126 of a coaxial line structure, the outer conductor of which is formed by cylindrical bores in a conductive block 128 fabricated in two sections **128*a* and 128*b* as shown in FIG. 6. To improve the transfer of heat from varactor 124, the dielectric 122*a* of the coaxial capacitor is formed of thermal conducting dielectric material, such as boron nitride or beryllium oxide, to provide a direct thermal path from the varactor through the coaxial capacitor to the metal block 128. Bias voltage for varactor 124 is applied via terminal 120** from a suitable D.C. source, not shown.

The output matching circuit of varactor 124 differs from that of the first doubler in FIG. 3 in that it includes three tunable shorted stubs 130, 138 and 140, and a coaxial cavity 132, for matching the output impedance of varactor 124 to the input of the second doubler and to suppress the fundamental frequency (562.5 megacycles) at the output of the first doubler. The coaxial cavity includes a fixed coaxial stub **132*a* to a tap 134 on which the center conductor 126 is connected, and a shorter collinear stub 132*b* which is axially movable to tune the cavity. The cavity is designed to be resonant at 1,125 megacycles and therefore suppresses the fundamental input frequency. The lower end of stub 132*a* is conductively secured to the block 128, and the signal is coupled from the cavity by a suitable coupling loop 136, one end of which is connected to the conductive structure 128. The cavity 132 has been found particularly effective in preventing the coupling of spurious signals to the second doubler at higher power levels. The shorted stub 130 provides reactive matching of the varactor diode to the output load of cavity 132, the tap 134 on the resonant stub 132*a* providing resistance matching. Thus, shorted stub 130 and cavity 132 provide impedance matching, trapping, and filtering in the same manner as open stub 68 and cavity 70 in FIG. 3. In effect, the cavity 132 has been substituted for the series-resonant circuit 60–62 of the arrangement of FIG. 3 to provide trapping of the fundamental frequency. Short circuited stubs 138 and 140 are used to match the output impedance of the first multiplier stage (at the output of cavity 132) to the input impedance of varactor 144**.

A short circuited quarterwave stub 142 on the input side of the varactor diode 144 of the second doubler provides an open circuit at the fundamental (1,125 megacycles) and a short circuit at the second harmonic (2,250 megacycles), and thus corresponds to trap 24 (FIG. 2) in the second doubler stage. The output signal from the first doubler is applied to varactor 144 through coaxial capacitor 146 to which a bias voltage is applied from an external source (not shown) via terminal 148 through the resonant stub 150 of output cavity 152 and conductor 154, the latter being joined at 156 to the stub in the manner described in connection with FIG. 3. The D.C. return for the varactor is through the shorted stubs 140 and 142. On the output side of varactor 144, an open circuited quarterwave stub 158 provides reactive matching of diode 144 to the output load impedance, and resistance matching of the diode is accomplished by appropriately positioning the tap 156 on the resonant stub 150. The output cavity 152 corresponds in all respects to the cavity 70 of FIGS. 3 and 4, its principal function being to filter the output of the second doubler (including trapping the fundamental input frequency). Energy is coupled from the cavity by an inductive loop 160 connected to an output coaxial coupler 162.

To provide a short heat flow path for the transfer of heat from the varactor, a heat sink 164, consisting of a disk of thermal conducting dielectric material, such as boron nitride or beryllium oxide, is pressed onto the cathode end of the varactor package. The outside diameter of the disk is such as to make good contact to the metal block 128.

Except for a different configuration of the cylindrical bores to accommodate different coaxial line elements, the assembly of FIG. 6 is fabricated in much the same way as the structure of FIG. 4. The top plate **128*b* is folded over on top of the lower plate 128*a* with corresponding semi-circular bores in accurate alignment, and the two plates firmly secured together by suitable bolts or other fasteners. As shown in the lower portion of the figure, some of the inner conductors are coaxially supported on insulating beads, while others are supported in insulating sleeves formed of a dielectric material selected to electrically lengthen the transmission line to improve tuning. Although not shown in FIG. 5, the stage which precedes the cascaded doublers from which the input signal of 562.5 megacycles is derived, is also mounted on the machined block 128**, at the left end thereof. The overall dimensions of the package are comparable to those of the structure of FIG. 3.

The circuit configuration of FIGS. 5 and 6 was found to give somewhat better performance than the configuration of FIGS. 3 and 4. Using an MA 4347E varactor in the first doubler, a conversion loss of 1.75 db. was experienced, giving an output of 4.0 watts at 1,125 megacycles for 6 watts input at 562.5 megacycle. A D4252C varactor was used in the second doubler, giving a conversion loss of 2.6 db. Thus, with a 4.0 watt input from the first doubler, an output signal of 2.2 watts at 2,250 megacycles was derived at the output terminal 162.

From the foregoing it is seen that applicant has provided cascaded doubler circuits capable of operation at microwave frequencies and at relatively high power levels. The assembly is very compact and light in weight, the compactness of the design besides reducing volume, contributing to the efficiency and stability of operation.

While there has been shown and described what are now regarded as preferred embodiments of the invention, various changes and modifications in details of construction will be suggested to ones skilled in the art. For example, at a different range in the frequency spectrum than the one here chosen, it may be necessary to modify the matching and trapping circuitry somewhat from that which has been illustrated. It is again emphasized that the invention is not limited to use at the frequencies referred to herein. The structure was reduced to practice at these frequencies, making it convenient to use them as examples. It is applicant's intention, therefore, that the invention not be limited to what has been shown and described except as such limitations appear in the appended claims.

What is claimed is:

1. Harmonic generation apparatus comprising, in combination, a coaxial transmission line structure including a main transmission line having an inner and an outer conductor, first and second varactor diodes connected in series in the inner conductor of said main line, a source of input signal at a first frequency, a lumped constant impedance matching network connected between said input signal source and said first varactor diode, a coaxial capacitor connected to and constituting an element of said matching network and positioned in said main line through which said input signal at said first frequency is applied to said first varactor diode, said first varactor diode being operative to produce a second frequency which is a harmonic of said first frequency, said coaxial capacitor providing a low impedance path between the inner and outer conductors of said main transmission line for said second frequency, means coupled to said main line between said first and second varactor diodes and operative to trap said first frequency and to match said first varactor diode to said second varactor diode at said second frequency, said second varactor diode being operative to produce a third frequency which is a harmonic of said second frequency, and means for coupling energy at said third frequency from said second varactor.

2. Apparatus for frequency multiplication at microwave frequencies comprising, in combination, a coaxial transmission line structure including a main transmission line having an inner and an outer conductor, first and second varactor diodes connected in the inner conductor of said main line at spaced apart points, a source of input signal at a first frequency, a lumped constant impedance matching network connected between said signal source and said first varactor diode, said network including a first coaxial capacitor connected in the inner conductor of said main line to the input terminal of said first varactor diode, said first varactor diode being operative to produce a second frequency which is a harmonic of said first frequency, said first coaxial capacitor providing a low impedance path between the inner and outer conductors of said main transmission line for said second frequency and harmonics thereof, means including a first coaxial cavity resonant at said second frequency coupled to said main line between said first and second varactor diodes and operative to trap said first frequency and to match said first varactor diode to said second varactor diode at said second frequency, said first cavity having end walls and a central stub, the inner conductor of said main line from said first varactor diode being connected to a point on said central stub selected to provide resistance matching of said first varactor diode to the output load of said first cavity, a first short-circuited quarterwave coaxial stub connected to said main line between said first varactor diode and said first cavity and operative to provide reactive matching of said first varactor diode to the output load of said first cavity, a second short-circulated quarterwave coaxial stub connected to said main line between said first cavity and said second varactor, said second varactor being operative to produce a third frequency which is a harmonic of said second frequency, a second coaxial cavity having a central stub, end walls and an outer conductor and dimensioned to be resonant at said third frequency to thereby suppress said second frequency, means connecting the inner conductor of said main line to a point on the central stub of said second cavity, selected to provide resistance matching of said second varactor diode to the output load of said second cavity, an open-circuited quarterwave coaxial stub coupled to said main line between said second varactor and said second cavity and operative to provide reactive matching of said second varactor diode to the output load of said second cavity, and means for coupling energy at said third frequency from said second cavity.

3. Apparatus in accordance with claim 2 wherein the outer conductors of said main transmission line, said cavities and said coaxial stubs comprise cylindrical bores in a conductive plate, and further including means for applying bias voltage to said first and second varactor diodes through said inner conductor, said first and second short-circuited quarterwave stubs being in contact with said plate to provide a direct current return path for said bias voltage and to conduct heat from said first and second varactor diodes, respectively.

4. Apparatus in accordance with claim 3 including a sleeve of thermally conductive dielectric material surrounding said first coaxial capacitor and engaging said plate for conducting heat from said first varactor diode.

5. In frequency multiplying apparatus operative at microwave frequencies, a section of coaxial transmission line having inner and outer conductors, first and second varator diodes connected in the inner conductor of said transmission line and each operative when biased to generate harmonics of an input signal frequency, said varactors being in series, coaxial cavities, one following each varactor, and each cavity having end walls and each including a central stub resonant at a selected one of said harmonics and operative to trap frequencies other than said selected harmonic produced by the preceding varactor diode, means connecting the inner conductor of said transmission line to a point on the stub of said first coaxial cavity, selected to provide resistance matching of said first varactor diode to the output of said first cavity, a coaxial stub of a length equal to approximately a quarter wavelength at said input frequency connected in branch relationship with said transmission line at a point between said second varactor and said second coaxial cavity, said coaxial stub being operative to provide a reactive match between said second varactor diode and the output load of said second cavity, a source of direct current biasing voltage for said second varactor diode connected to the central stub of said second cavity, and means for coupling said selected harmonic from said second cavity.

6. Apparatus in accordance with claim 5 wherein the central stub of each cavity is supported for a portion of its length in non-contacting relationship with the outer conductor of said cavity, said portion being approximately a quarter wavelength long at said selected harmonic frequency so as to provide a radio frequency short circuit between said stub and one end wall of said cavity.

7. Apparatus in accordance with claim 6 including a second, axially movable, stub mounted in said first cavity collinearly with said central stub for tuning said cavity.

8. Apparatus in accordance with claim 1 wherein the outer conductor of said main transmission line comprises a cylindrical bore in a conductive plate, and further including a thermally conductive dielectric sleeve surrounding said coaxial capacitor and contacting said plate for conducting heat from said first varactor diode.

9. Apparatus in accordance with claim 1 wherein said means coupled to said main line between said first and second varactor diodes includes a coaxial cavity resonant at said second frequency and including end walls and a central stub, the inner conductor of said main line being connected to a point on said central stub selected to provide resistance matching of said first varactor diode to the output load of said cavity, and a quarterwave coaxial stub connected to said main line between said first varactor diode and said cavity and operative to provide reactive matching of said first varactor diode to the output load of said cavity.

10. Apparatus in accordance with claim 9 wherein the outer conductor of said main transmission line, said quarterwave coaxial stub and said coaxial cavity comprise cylindrical bores in a conductive plate, said coaxial cavity being operative to trap said second frequency and higher order harmonics thereof, and a thermally conductive dielectric sleeve surrounding said coaxial capacitor and contacting said plate for conducting heat from said first varactor diode.

11. Apparatus in accordance with claim 2 wherein the central stub of said second cavity is supported for a portion of its length in non-contacting relationship with the outer conductor of said second cavity, said portion being approximately a quarter wavelength long at said third frequency so as to provide a radio frequency short circuit between said stub and one end wall of said second cavity, and a source of direct current biasing potential for said second varactor diode connected to the central stub of said second cavity.

(References on following page)

References Cited by the Examiner

UNITED STATES PATENTS

| | | | |
|---|---|---|---|
| 2,408,420 | 10/1946 | Ginzton | 321—60 |
| 2,460,109 | 1/1949 | Southworth | 321—60 |
| 2,944,205 | 7/1960 | Keizer et al. | 321—69 |
| 2,978,649 | 4/1961 | Weiss | 330—56 |
| 3,085,205 | 4/1963 | Sante | 328—16 |
| 3,175,164 | 3/1965 | Schreiner | 330—4.9 |

OTHER REFERENCES

"A New Look at Coaxial Cavities for Varactor Multipliers"; Electronics, vol. 38, No. 10; May 17, 1965, (pp. 56–64 relied upon), copy in 321-69W.

JOHN F. COUCH, *Primary Examiner.*

LLOYD McCOLLUM, *Examiner.*

G. J. BUDOCK, G. GOLDBERG, *Assistant Examiners.*

UNITED STATES PATENT OFFICE

CERTIFICATE OF CORRECTION

Patent No. 3,263,154 July 26, 1966

Kenneth P. Steele

It is hereby certified that error appears in the above numbered patent requiring correction and that the said Letters Patent should read as corrected below.

Column 8, line 57, before "said" insert -- and --; line 58, for "cavity being" read -- capacitor is --.

Signed and sealed this 5th day of September 1967.

(SEAL)
Attest:

ERNEST W. SWIDER
Attesting Officer

EDWARD J. BRENNER
Commissioner of Patents